3,427,373
METHOD FOR THE MANUFACTURE OF ALUMINA REFRACTORIES HAVING AN ALUMINUM NITRIDE COATING

Shigetomo Matsuo, Tokyo, and Yosiaki Matsuki and Katsutoshi Kometya, Kawasaki-shi, Japan, assignors to Tokyo Shibaura Electric Co., Ltd., Kawasaki-shi, Japan, a corporation of Japan
No Drawing. Filed June 7, 1965, Ser. No. 462,069
Claims priority, application Japan, June 11, 1964, 39/32,902
U.S. Cl. 264—60
Int. Cl. C04b *35/64, 35/10, 33/32*

3 Claims

ABSTRACT OF THE DISCLOSURE

A method of manufacturing an alumina refractory body, wherein a compression molded or a sintered body containing alumina is heated in a nitrogen atmosphere while the surface of the body is maintained in contact with carbon, so that a coating of aluminum nitride is formed on said surface.

---

This invention relates to a method of manufacturing alumina refractories having an aluminum nitride coating.

Alumina refractories are usually obtained by compression molding an alumina powder to a desired configuration and firing or sintering the resultant molding in an oxygen or hydrogen atmospheric furnace. The alumina refractory material obtained by such a method has a heat resisting temperature of about 1800° C., a relatively low thermal conductivity and a high thermal expansion coefficient so that its heat resisting property is not satisfactory. It also has such a defect that its corrosion toward molten metals is large.

Although aluminum nitride does not take a form of a liquid phase at the atmospheric pressure and is sublimated at 2450° C. to decompose, its pyrogenetic strength is large and its thermal expansion coefficient small when compared with the other ceramics. Therefore, the aluminum nitride having excellent thermal shock resistance can sufficiently withstand a quick cooling from 2200° C. to the normal temperature. Further, aluminum nitride is relatively stable to heating at elevated temperatures not only in the atmosphere of nitrogen or in other inert atmospheres, but also in the atmosphere of hydrogen. Furthermore, aluminum nitride has such a property that it tends not to wet on molten metals and hence has excellent corrosion resistance.

The object of this invention is to provide an alumina refractory material having an aluminum nitride layer coated thereon which has excellent heat resistance and corrision resistance properties.

The other objects and advantages will become apparent from the following detailed description of the invention.

According to the method of this invention, an alumina powder is first compression molded into a desired shape. The molded or sintered alumina body so obtained is heated to elevated temperatures in the atmosphere of nitrogen while being maintained to contact at its surface with a carbon powder. One of the methods of maintaining the carbon powder in contact with the surface of the alumina body is to suspend the carbon powder in a dispersion medium containing a suitable binder and to apply and coat the suspension on the surface of the alumina body. Another method may be to place the alumina body in a crucible and to charge the carbon powder into the spacing between the alumina body and the crucible. In the former method, the alumina body coated with the carbon powder is heated directly in the presence of nitrogen, while in the latter case the crucible and its enclosure are heated in the atmosphere of nitrogen. The heating temperature is between 1700° C.–1750° C. Then the alumina refractory coated with a layer of aluminum nitride may be obtained by a reaction represented by $$Al_2O_3 + 3C + N_2 \rightarrow 2AlN + 3CO$$

Among the preferred dispersion mediums for depositing the carbon powder on the surface of the alumina body is a solution of alkylcellulose, nitrocellulose, polyvinyl alcohol, starch paste, water glass or the like which has suitable adhesiveness. The reason for this rseides in the convenience of ease of drying since such mediums use either an organic solvent or water. With those dispersion mediums, the carbon powder may be deposited on the alumina body by means, for example, of spraying by a spray-gun, coating by a brush or dipping. After it has been dried in the atmosphere, the alumina body coated with the carbon powder layer is treated in the manner above mentioned by subjecting it to heating reaction in the nitrogen atmospheric furnace so as to obtain a refractory material coated with the aluminum nitride layer.

The refractory material manufactured in accordance with this invention is particularly excellent in heat resistance and corrosion resistance properties owing to the various properties inherent to aluminum nitride.

The following examples are given for the purpose of illustrating the invention; all percentages are by weight.

EXAMPLE 1

An alumina powder capable of passing through a 200 mesh screen was previously cold molded under a pressure of 2 ton/cm.$^2$ to obtain a cylindrical alumina molding of a 20 mm. diameter and a 40 mm. height. While as a suspension for coating the surface of the alumina molding with a carbon powder, a dispersion medium containing 2% of polyvinyl alcohol was added with 5% of the carbon powder in weight proportion to the dispersion medium. The mixture was introduced in a pot mill and agitated for about one hour to prepare a liquid wherein the carbon powder was well suspended in the dispersion medium.

The suspension of the carbon powder thus obtained was applied on the surface of the alumina molding. Upon natural drying, the molding was introduced into a nitrogen atmospheric furnace having a heating source of carbon tubing heated to a gradually elevated temperature by the application of nitrogen gas and fired for 6 hours at 1750° C. The residual unreacted carbon at the termination of reaction could be readily peeled off and removed from the surface of the molding and a refractory material having an aluminum nitride coating on the alumina molding was obtained. It was observed that this aluminum nitride layer showed, upon experiment by X-ray diffraction, to be a crystalline material corresponding to AlN of the American Society for Testing Materials (A.S.T.M.) card.

The refractory material having the aluminum nitride coating of this invention and an equivalent alumina refractory material produced by a prior art method having no such coating were heat tested in a nitrogen atmospheric furnace by maintaining them at a temperature of 2000° C. for one hour. The results showed that the former maintained the original configuration before it had been introduced into the furnace without variation, while the latter was partially molten and exhibited a bad configuration.

Another test was made to know the wettability of the above former and the latter refractory materials to a molten metal by placing an aluminum block on each of them and heating them in a vacuum furnace of 10$^{-4}$ mm. Hg at 1200° C. for 10 minutes. The results showed that the aluminum block on the former material turned to be of a spheroidal shape because of its cohesion and did not wet on the molding, while in the latter the aluminum block was molten and adhered on the surface of the molding so that its removal from the surface was difficult. This will indicate that the refractory material according to this invention has a property of poor wettability to molten metals.

EXAMPLE 2

An alumina powder passable through a 200 mesh screen was cold molded under a pressure of 1 ton/cm.² to obtain a cylindrical molding having a diameter of 20 mm. and a height of 30 mm. The molding was then put in a carbon crucible of a 40 mm. out diameter a 30 mm. inner diameter and a 50 mm. height. Thereafter, a carbon powder capable of passing through a 200 mesh screen was charged into a spacing between the crucible and the molding, The crucible with the molding was introduced into a nitrogen atmospheric furnace where it was fired at a temperature of 1700° C. for two hours.

Upon firing reaction, a layer of the coating on the surface of the refractory material was tested by X-ray diffraction, it being observed that the layer was completely rendered to be aluminum nitride.

Similar heat and wet tests as in Example 1 conducted on the alumina refractory material having an aluminum nitride coating in accordance with this invention and that obtained according to a conventional method which has no such coating resulted in similar results as in the previous Example 1.

EXAMPLE 3

Upon the surface of a commercially available alumina brick containing 98% or over of alumina and having a porosity of 60% and the highest available temperature of 1850° C. was applied by brush a mixed suspension prepared by forming a dispersion medium of an aqueous solution containing 5% of methyl cellulose, adding thereto 20% by weight of a 200 mesh screen passable carbon powder, and stirring the mixture thus obtained for one hour in a pot mill. The suspension applied brick was thereafter dried in the atmosphere. The brick was then introduced into a nitrogen atmospheric furnace having a heating body of carbon tubing and heated, while being subjected to a current of nitrogen gas, to 1700° C. for 10 hours to terminate sintering. An X-ray diffraction test on the resultant coating portion of the alumina brick showed that the portion had been completely converted into aluminum nitride.

A similar fire test and a wet test to a molten metal as in Example 1 were made with respect to the alumina refractory materials having a coating aluminum nitride of this invention and that produced by a conventional method which comprised no coating layer. The tests showed equivalent results to those in Example 1.

In the case of using the above mentioned alumina fire brick available in the market which contains about 2% of $SiO_2$, the following reaction is considered to take place.

$$Al_2O_3 + 3C + N_2 \rightarrow 2AlN + 3CO$$
$$3SiO_2 + 6C + 2N_2 \rightarrow SiO_3N_4 + 6CO$$

Thus, the coating layer of the brick consists of a mixed layer of AlN and a small amount of $Si_3N_4$. The heat resisting temperature of $Si_3N_4$ is 1950° C. and slightly inferior to that of AlN. On the other hand, $Si_3N_4$ has a property of not readily wetting on molten metals, so that its heat resisting property as well as antiwettability are sufficient for the purpose if used at temperatures below 1950° C.

It will be understood by those skilled in the art that various modifications of the invention illustrated above can be made without departing from the spirit and scope thereof, and therefore, the only limitations intended are those expressed in the appended claims.

What is claimed is:
1. A method for the manufacture of an alumina article having a coating of aluminum nitride on its surface, comprising:
   compression molding a body of alumina of a shape conforming to the shape of the coated article, from an alumina powder;
   heating said body in an atmosphere of nitrogen to a temperature between 1700° C. and 1750° C. while maintaining a carbon powder in contact with the surface of said body; and
   continuing said heating of said body at said temperature in said atmosphere of nitrogen for a time sufficient to convert only the surface of said alumina body from alumina to aluminum nitride, and not sufficient to convert the entire body to aluminum nitride.
2. A method for the manufacture of an alumina article having a coating of aluminum nitride on its surface, comprising:
   compression molding a body of alumina of a shape conforming to the shape of the coated article, from an alumina powder;
   applying a suspension of a carbon powder to the surface of said body, depositing carbon on the surface of said body;
   heating said body in an atmosphere of nitrogen to a temperature between 1700° C. and 1750° C. while maintaining said carbon in contact with the surface of said body; and
   continuing said heating of said body at said temperature in said atmosphere of nitrogen for a time sufficient to convert only the surface of said alumina body from alumina to aluminum nitride, and not sufficient to convert the entire body to aluminum nitride.
3. A method for the manufacture of an alumina article having a coating of aluminum nitride on its surface, comprising:
   compression molding a body of alumina of a shape conforming to the shape of the coated article, from an alumina powder;
   embedding said body in a carbon powder contained in a crucible;
   heating said crucible in an atmosphere of nitrogen to a temperature between 1700° C. and 1750° C. while maintaining said body embedded in the carbon powder in contact with the surface of said body; and
   continuing said heating of said body at said temperature in said atmosphere of nitrogen from a time sufficient to convert only the surface of said alumina body from alumina to aluminum nitride, and not sufficient to convert the entire body to aluminum nitride.

References Cited

UNITED STATES PATENTS

| 1,031,581 | 7/1912 | Peacock | 23—192 |
| 2,902,739 | 9/1959 | Foster. | |
| 3,092,455 | 6/1963 | Paris et al. | 23—192 |
| 3,194,635 | 7/1965 | Lapp et al. | 106—65 X |
| 3,238,018 | 3/1966 | Winter et al. | 23—192 |
| 3,259,509 | 7/1966 | Matkovich et al. | 106—65 |

DONALD J. ARNOLD, *Primary Examiner.*

U.S. Cl. X.R.

23—192; 106—65; 264—62, 65